United States Patent

Heil et al.

Patent Number: 5,551,914
Date of Patent: Sep. 3, 1996

[54] DEVICE FOR PROVIDING FRESH AIR TO THE PASSENGER COMPARTMENT OF A VEHICLE

[75] Inventors: Michael Heil, Markt Schwaben; Karl-Heinz Eder, Munich, both of Germany

[73] Assignee: Bayerische Motoren Werke AG, Germany

[21] Appl. No.: 374,569

[22] PCT Filed: Mar. 18, 1993

[86] PCT No.: PCT/EP93/00647

§ 371 Date: Jan. 20, 1995

§ 102(e) Date: Jan. 20, 1995

[87] PCT Pub. No.: WO94/02333

PCT Pub. Date: Feb. 3, 1994

[30] Foreign Application Priority Data

Jul. 21, 1992 [DE] Germany .............. 42 24 051.4

[51] Int. Cl.⁶ .................................................. B60H 1/28
[52] U.S. Cl. ................... 454/146; 454/147; 454/158
[58] Field of Search ................... 454/146, 147, 454/148, 158

[56] References Cited

U.S. PATENT DOCUMENTS

| | | |
|---|---|---|
| 3,157,104 | 11/1964 | Nallinger . |
| 4,547,323 | 7/1986 | Mordau et al. ............. 454/147 X |
| 4,722,265 | 2/1988 | Koukal et al. ............. 454/147 |
| 4,874,148 | 10/1984 | Rolter ............. 454/147 X |
| 5,056,423 | 10/1991 | Koukal et al. ............. 454/147 |

FOREIGN PATENT DOCUMENTS

| | | |
|---|---|---|
| 410113 | 1/1991 | European Pat. Off. . |
| 2601302 | 1/1988 | France . |
| 3330951 | 3/1985 | Germany . |
| 3924293 | 1/1991 | Germany . |
| 3923307 | 1/1991 | Germany . |

*Primary Examiner*—Harold Joyce
*Attorney, Agent, or Firm*—Evenson, McKeown, Edwards & Lenahan, P.L.L.C.

[57] ABSTRACT

Fresh air supplied to the passenger compartment of a vehicle is aspirated via a common fresh air aspirating opening and is conducted to two separately arranged filter devices. The fresh air cleaned in each filter device then is separately conducted to a common air collecting chamber, in which the blower of a heating and/or air conditioning system is disposed.

10 Claims, 2 Drawing Sheets

DEVICE FOR PROVIDING FRESH AIR TO THE PASSENGER COMPARTMENT OF A VEHICLE

BACKGROUND AND SUMMARY OF THE INVENTION

The invention relates to a device for providing fresh air to the passenger compartment of a vehicle having a hood, comprising a filter device arranged on a back of the hood and connected with an air collecting chamber in a front wall area of the vehicle, a blower arranged to aspirate and convey air to air outlet openings terminating in an interior portion of the vehicle, and fresh air intake openings are provided in the hood at a level of the filter device.

DE 39 23 307 A shows a device in which the fresh air is aspirated in the forward area of the vehicle and is brought to the front side via air guide conduits integrated into the hood. A filter device is provided inside the hood, and is accessible when the hood is opened and a cover plate removed.

The disadvantage in this known device is that the entire hood is used for the guidance of the air. Consequently, a minimum height is required, which can be realized only with difficulty at all points of the hood.

U.S. Pat. No. 3,157,104 shows another device for providing fresh air to the passenger compartment of a vehicle. Here, the fresh air is conducted via two separately disposed fresh air intake openings into a pressure compensation chamber from where it flows, separated into two separate flows, via two filters into an air collecting chamber, from where a blower conducts the cleaned fresh air to air outlet nozzles in the interior of the vehicle. The pressure compensation chamber ahead of the filters is used to even out the possibly different mass flows entering via the two fresh air openings.

The disadvantage in this arrangement is that coarse dirt and water can reach the filter surfaces and block or moisten them. As a result, the flow-through resistance of the filter will rise rapidly so that sufficient amounts of fresh air no longer can reach the passenger compartment. This is particularly disturbing in wet weather, because in that case the windshield has a particular tendency of becoming fogged on the inside and then can no longer be sufficiently dried.

It is an object of the present invention to provide a small-dimensioned, maintenance-friendly and effectively operating fresh air supply with a filter device.

This object has been attained in accordance with the invention by providing that the fresh air flow is divided into two partial flows after passing the fresh air intake openings and the two partial flows are brought to two filters, such that the partial flows are guided around the filters and flow upwardly therethrough, and the cleaned fresh air is separately guided from each of the filters into the common air collecting chamber. The distribution of the fresh air flow aspirated via the common fresh air intake openings to two filter devices reduces the structural space required by the air guidance inside the hood and permits the optimum utilization of the structural space provided, so that it is possible even to use filter devices of different sizes. A pressure compensation then takes place in the common air collecting chamber ahead of the blower. Because of this configuration, the flow of the not-yet cleaned air is reversed several times, so that coarse dirt and water can be effectively removed. It is assured thereby that the surfaces of the filters remain free of liquid so that the flow resistance only is slowly increased as a result of aging.

A further advantageous feature of the present invention is that liquids carried along are removed and are kept from reaching the filters.

Still a further advantageous aspect of the present invention is that the structural outlay for the fresh air guidance is simplified in that it is not necessary to provide a multitude of guide plates. This is achieved instead by separate housings which are inserted into the filter device.

Depending on the distance of the hood from the area of the front wall of the vehicle in which the air collecting chamber is located, guide conduits can be provided on the front wall for conducting the cleaned fresh air from the filter device to the air collecting chamber.

Water or other objects are prevented from penetrating into the air collecting chamber when the hood is opened by closing the inlet openings into the guide conduits by hinged flags which are actuated by guide devices on the filter device. Entry of water is a particular threat when the vehicle is a vehicle with a front engine and engine cleaning is performed.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
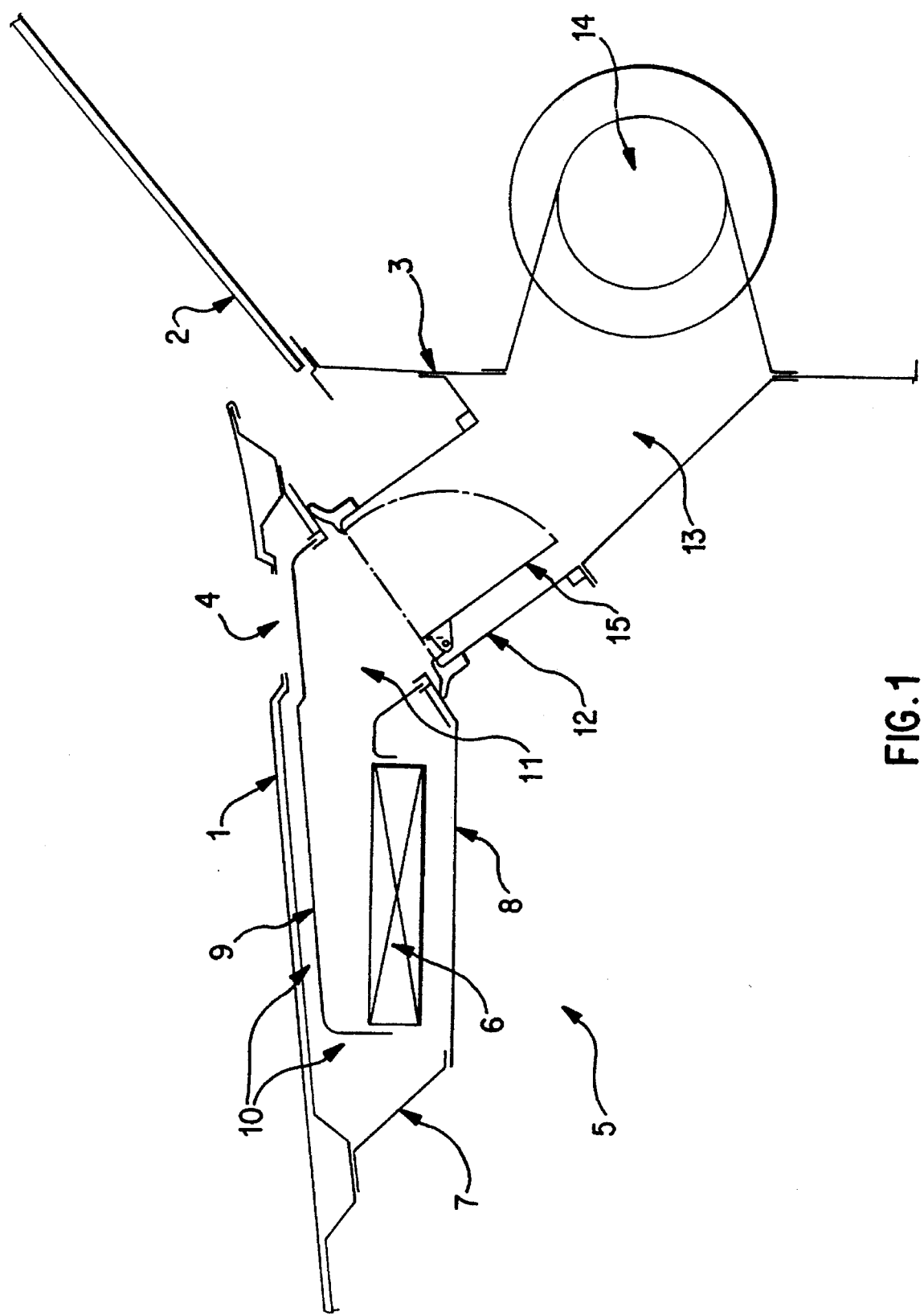
FIG. 1 is a schematic cross sectional view of the front wall area of a motor vehicle.

The front wall area of a motor vehicle is schematically illustrated in FIG. 1. In particular, a portion of a hood 1 can be seen, as well as a windshield 2, in the lower area of which a front wall 3 is provided. At its end toward the passenger compartment, the hood 1 has air intake openings 4 for guiding ambient air to the rear of the hood.

A filter device designated generally by numeral 5 is disposed on the back, i.e. on the side facing away from the outside of the hood 1 and consists of two filters 6 disposed in a common tub-shaped filter housing 7. The filter housing 7 is attached to the back of the hood 1. A cover flap 8 is provided on the filter housing 7 for removing each filter 6.

Inside the filter housing 7, each filter 6 is maintained on respectively one housing 9 which has been fastened to the inside of the filter housing 7. In this way the area of the filtered air, i.e. the air which has flown through the filters 6, is separated inside the filter housing 7 which defines the area of the ambient air. Each housing 9 is at a distance from the back of the hood 1. Thereby, an air guide conduit 10 is formed around each housing 9 and extends from the fresh air intake openings 4 to the filters 6, which for this reason can be disposed almost horizontally at the beginning of the housing 9 and through which the air flows upwards. Thus, the aspirated air is reversed three times before entering the filter 6, namely for the first time at the fresh air intake opening 4 and then twice in the air guide conduit 10. Consequently, heavier particles and especially drops of liquid can be separated from the air flow and reach the lowest point of the filter housing because of the force of gravity. An opening (not shown) can be provided there which is used to let the entrained and collected water out. This opening can be controlled by valves which, on one hand, permit the water to exit but, on the other hand, prevent the entrance of air. This is always important when the opening is located toward the engine compartment.

After flowing through the filters 6, the cleaned air is guided via the air guide conduit 11 formed in the housing 9 to the air guide conduit 12 which leads in extension of the air guide conduit 11 to the front wall 3. An air collecting chamber 13 is formed on the front wall 3 or in the vehicle interior, on which a blower 14 is disposed which is a part of a known heating and/or air conditioning system. The air guide conduit 12 is fastened on the air collecting chamber 13.

Figure 2:
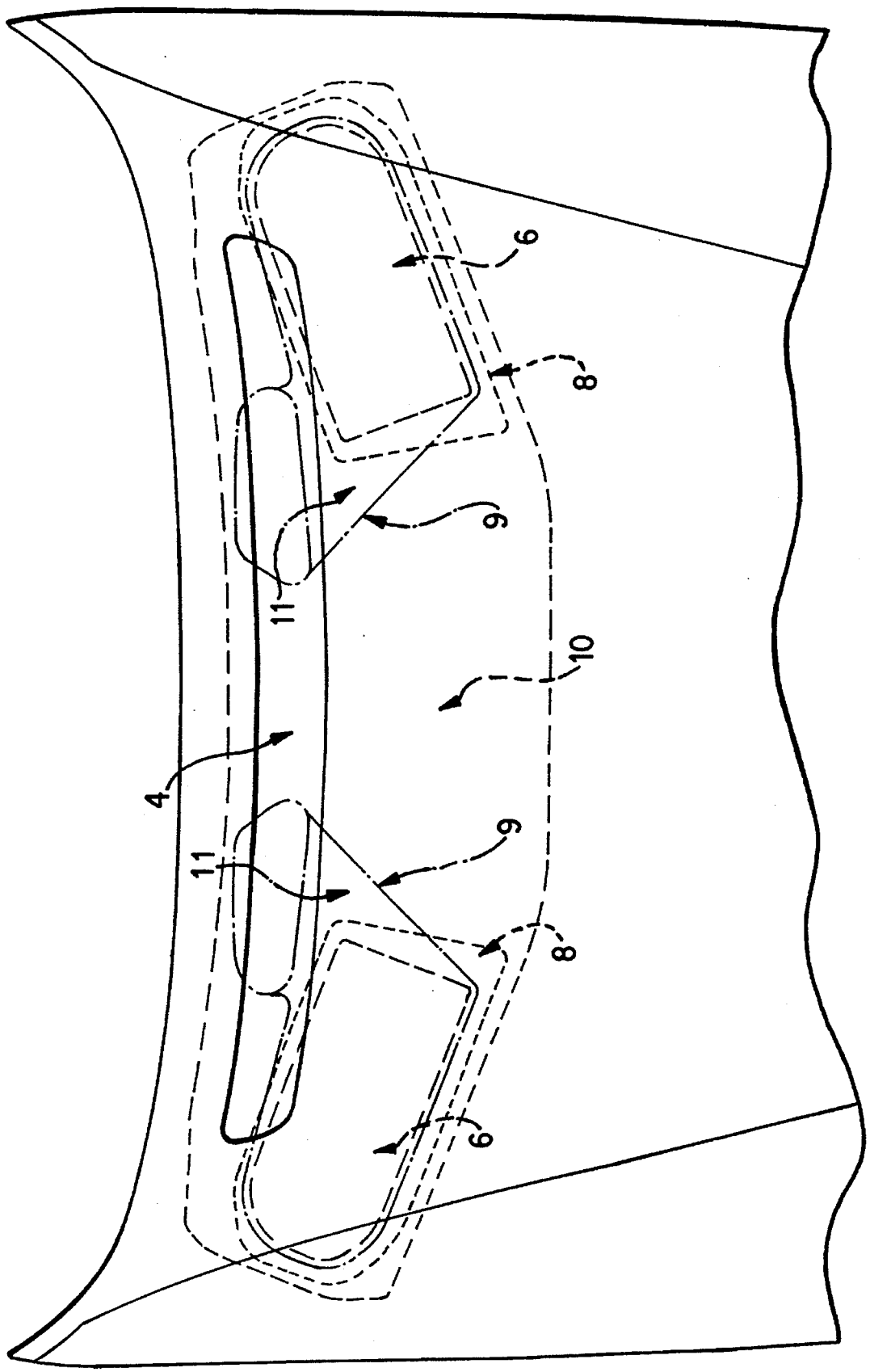
FIG. 2 is a top view of the end of a hood at the side of the passenger compartment.

As can be seen in particular from FIG. 2, the air intake opening 4 extends over almost the entire width of the hood 1 in order to define the filter area over a large space. Furthermore, the filter housing 7 is used for collecting and guiding the fresh air from the air intake openings 4 to the two filters 6.

In FIG. 2 it can also be seen clearly that there are two filters 6 and that accordingly there are two housings 9 which separately guide the cleaned fresh air to the two air guide conduits 12. The two cleaned air flows are only united in the air collecting chamber 13.

To prevent dirt or water (for example when the engine is cleaned) from entering the two air guide conduits 12 when the hood is opened, they are each closed off by a hinged flap 15. The two hinged flaps are opened by guide pins (not shown in detail) on the filter housing 7 which, when the hood 1 is closed, pivot the hinged flaps 15 and with the hood 1 closed maintain the hinged flaps 15 in the opened position drawn in. The hinged flaps are embodied to be spring-loaded to attain the closed position shown by dashed lines when the hood 1 is opened.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A device for providing fresh air to the passenger compartment of a vehicle having a hood, comprising a filter device arranged on a back of the hood and connected with an air collecting chamber in a front wall area of the vehicle, a blower arranged to aspirate and convey air to air outlet openings terminating in an interior portion of the vehicle, and fresh air intake openings provided in the hood at a level of the filter device, wherein means is provided for dividing the fresh air flow into two partial flows after passing the fresh air intake openings and bringing the two partial flows to two filters, such that the partial flows are guided around the filters and flow upwardly therethrough, and the cleaned fresh air is separately guided from each of the filters into the common air collecting chamber.

2. The device according to claim 1, wherein the filter device has a separate cover flap.

3. The device according to claim 1, wherein the filters are each disposed in a housing which guides the fresh air to the filters.

4. The device according to claim 1, wherein guide conduits are provided on the front wall area for conducting the cleaned fresh air from the filter device to the air collecting chamber.

5. The device according to claim 4, wherein, the inlet openings into the guide conduits are closable by selectively actuatable hinged flaps.

6. The device according to claim 4, wherein the filter device has a separate cover flap.

7. The device according to claim 6, wherein the filters are each disposed in a housing which guides the fresh air to the filter within the filter device.

8. The device according to claim 4, wherein, the inlet openings into the guide conduits are closable by selectively actuatable hinged flaps.

9. The device according to claim 5, wherein the filter device has a separate cover flap.

10. The device according to claim 5, wherein the filters are each disposed in a housing which guides the fresh air to the filter.

* * * * *